(12) United States Patent
Asang

(10) Patent No.: US 12,172,579 B2
(45) Date of Patent: Dec. 24, 2024

(54) MOUNTING ARRANGEMENT FOR A SENSOR

(71) Applicant: Bayerische Motoren Werke Aktiengesellschaft, Munich (DE)

(72) Inventor: Peter Asang, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

(21) Appl. No.: 17/779,261

(22) PCT Filed: Oct. 23, 2020

(86) PCT No.: PCT/EP2020/079855
§ 371 (c)(1),
(2) Date: May 24, 2022

(87) PCT Pub. No.: WO2021/104769
PCT Pub. Date: Jun. 3, 2021

(65) Prior Publication Data
US 2022/0402441 A1 Dec. 22, 2022

(30) Foreign Application Priority Data
Nov. 25, 2019 (DE) .................... 10 2019 131 789.4

(51) Int. Cl.
*B60R 11/00* (2006.01)
(52) U.S. Cl.
CPC ....... *B60R 11/00* (2013.01); *B60R 2011/0026* (2013.01)

(58) Field of Classification Search
CPC ... B60R 11/00; B60R 2011/0042; B60R 1/12; B60R 1/04; B60R 2011/0026
(Continued)

(56) References Cited

U.S. PATENT DOCUMENTS 3,601,352 A * 8/1971 Jensen ............... B60R 1/04
248/549
4,626,086 A * 12/1986 Ohyama ............... B60R 1/04
359/872
(Continued)

FOREIGN PATENT DOCUMENTS

| CN | 1522206 A | 8/2004 |
|---|---|---|
| CN | 106573581 A | 4/2017 |

(Continued)

OTHER PUBLICATIONS

International Search Report (PCT/ISA/210) issued in PCT Application No. PCT/EP2020/079855 dated Dec. 8, 2020 with English translation (six (6) pages).
(Continued)

*Primary Examiner* — Christopher Garft
*Assistant Examiner* — Michael McDuffie
(74) *Attorney, Agent, or Firm* — Crowell & Moring LLP

(57) ABSTRACT

A mounting arrangement for fastening a sensor element to a windscreen of a motor vehicle includes a main support, which has a receptacle for the sensor element. The sensor element has a cross-section in the shape of a segment of a circle. The receptacle of the main support has a clear receptacle opening which is likewise in the shape of a segment of a circle and the dimensions of which match the sensor element.

19 Claims, 1 Drawing Sheet

(58) Field of Classification Search
USPC .......... 340/425.5, 435, 438; 248/475.1, 467, 248/466, 208; 73/866.5
See application file for complete search history.

(56) References Cited

U.S. PATENT DOCUMENTS

| | | | | |
|---|---|---|---|---|
| 5,065,892 | A | * | 11/1991 | Lukez .................... B65D 90/48 73/866.5 |
| 5,133,428 | A | * | 7/1992 | Perrson .................. H04R 1/323 181/153 |
| 5,587,236 | A | * | 12/1996 | Agrawal ........... B32B 17/10036 248/467 |
| 6,581,484 | B1 | | 6/2003 | Schuler |
| 6,882,734 | B2 | * | 4/2005 | Watson ............... B60R 11/0252 381/86 |
| 7,726,623 | B2 | * | 6/2010 | Muller ...................... B60R 1/04 248/475.1 |
| 8,456,311 | B2 | * | 6/2013 | Wohlfahrt .............. F16M 13/02 73/170.17 |
| 9,272,665 | B2 | * | 3/2016 | Minikey, Jr. .............. B60R 1/04 |
| 9,573,525 | B2 | * | 2/2017 | Minikey, Jr. .............. F16F 1/32 |
| 10,427,605 | B2 | * | 10/2019 | Herrmann ................. B60R 1/04 |
| 10,744,944 | B2 | * | 8/2020 | Steffes .................... B60R 1/086 |
| 2004/0174042 | A1 | | 9/2004 | Izabel et al. |
| 2008/0315060 | A1 | | 12/2008 | Muller |
| 2009/0134985 | A1 | | 5/2009 | Schmitt et al. |
| 2012/0013741 | A1 | * | 1/2012 | Blake, III .............. H04N 23/55 348/148 |
| 2015/0097013 | A1 | | 4/2015 | Rawlings et al. |
| 2016/0016518 | A1 | | 1/2016 | Jeon et al. |
| 2017/0036647 | A1 | | 2/2017 | Zhao et al. |
| 2020/0079295 | A1 | * | 3/2020 | Yamamoto .......... B60R 11/0241 |
| 2022/0402441 | A1 | * | 12/2022 | Asang .................. B60S 1/0881 |

FOREIGN PATENT DOCUMENTS

| | | |
|---|---|---|
| DE | 10 2006 035 184 A1 | 2/2008 |
| DE | 10 2008 052 511 B3 | 5/2010 |
| DE | 10 2012 017 942 A1 | 3/2014 |
| DE | 10 2014 119 437 A1 | 1/2016 |
| EP | 1 491 404 A1 | 12/2004 |
| EP | 2 006 156 A2 | 12/2008 |
| EP | 2 705 986 A1 | 3/2014 |
| EP | 2 980 777 A1 | 2/2016 |
| EP | 3 323 679 B1 | 7/2019 |

OTHER PUBLICATIONS

German-language Written Opinion (PCT/ISA/237) issued in PCT Application No. PCT/EP2020/079855 dated Dec. 8, 2020 (six (6) pages).
German-language Office Action issued in German Application No. 10 2019 131 789.4 dated Jul. 15, 2020 with (four (4) pages).
English translation of Chinese Office Action issued in Chinese Application No. 202080074988.X dated May 23, 2023 (6 pages).

* cited by examiner

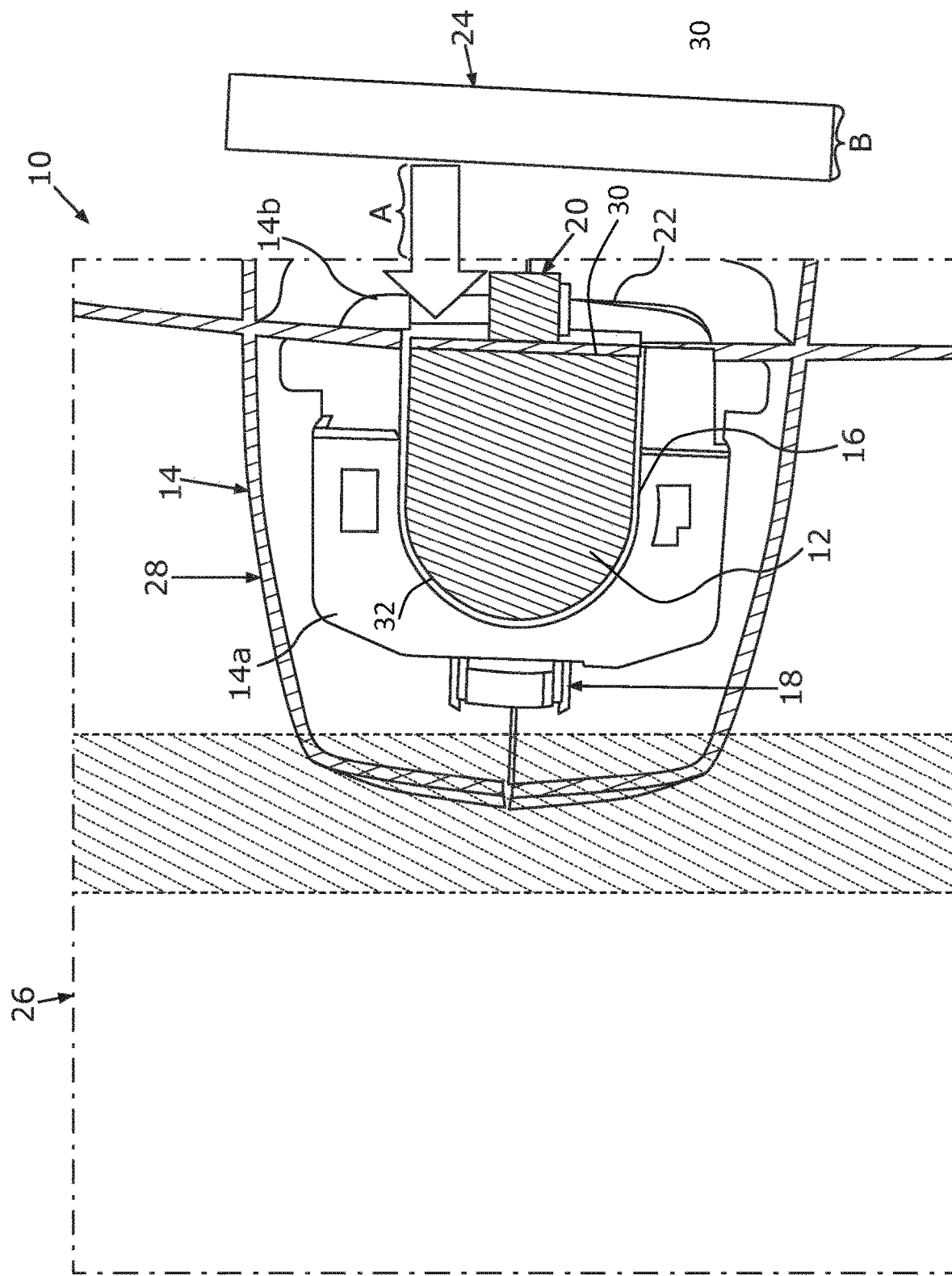

MOUNTING ARRANGEMENT FOR A SENSOR

BACKGROUND AND SUMMARY

The invention relates to a mounting arrangement for the fastening of a sensor element to a windshield of a motor vehicle and to the use of a mounting arrangement for the fastening of a sensor element to the windshield of a motor vehicle.

Mounting arrangements for the fastening of sensors to the surface of a windshield of a vehicle are known in the prior art. It is for example known for a rain sensor or a light sensor to be placed directly on the windshield. For this purpose, in the prior art, a mounting device is used which has a ring-shaped frame. This frame can then be adhesively bonded to the windshield, and the sensor can be inserted into this frame.

Document DE 10 2008 052 511 B3 discloses a holder for a rain sensor, light sensor, a camera, a mirror or the like, which is fixed by means of an adhesive to the surface of a window, preferably to a windshield of a vehicle.

DE 10 2014 119 437 A1 relates to an integrated interior mirror arrangement for a vehicle and may have a support, which is fixed to a front windshield of the vehicle, and an interior mirror, which is coupled to the support, wherein the support has an intermediate support, which is coupled to a rear surface of the interior mirror, and a base, which is attached to a upper end of the front windshield and on which a rain sensor is installed.

Document EP 1 491 404 A1 describes a fastening of components to the window pane of a motor vehicle with a fastening element which is connected by adhesive bonding to the window pane of the motor vehicle and which receives the component and which is composed of plastic.

It is an object of the invention to provide an improved mounting arrangement for the fastening of a sensor element, which mounting arrangement takes up less structural space than was previously the case.

The object is achieved according to the invention by a mounting arrangement for a motor vehicle and the use of the mounting arrangement for the fastening of the sensor element according to the independent claims. The dependent patent claims and the description relate to advantageous embodiments of the invention.

A mounting arrangement according to the invention for the fastening of a sensor element to a windshield of a motor vehicle comprises a main support which has a receptacle for the sensor element, wherein the sensor element is of circular-segment-shaped configuration in cross section, and the receptacle of the main support has a clear receiving opening which is likewise circular-segment-shaped and which is adapted in terms of its dimensions to the sensor element.

The main support may be fastened to the windshield by adhesive bonding. Owing to the circular-segment-shaped design, the structural space taken up by the sensor element is reduced. This makes possible a compact interior mirror fastening, which can be positioned higher up on the windshield. The view of other traffic participants, such as pedestrians and cyclists, is thus impaired to a lesser extent, whereby the risk of accidents can be considerably reduced.

In one advantageous embodiment, provision is made for the receptacle of the main support to be formed by an upper frame element and a lower frame element. The formation of the two frame elements makes it possible for the sensor element to be introduced more easily, which sensor element does not need to be introduced into the receptacle before the main support is attached to the windshield, but may also be pushed into the circular-segment-shaped receptacle after the main support has been fastened to the windshield. This structural form therefore allows simplified installation and also easy exchange of the sensor element.

According to one advantageous embodiment, the lower frame element has an installation edge for the introduction of the sensor element. The installation edge may be rounded. The installation edge may also be provided with a deformable coating. Deformable coatings may be polymers, preferably rubber, foams or silicones.

The installation edge makes it easier for the sensor element to be pushed into the receptacle. Damage to the surface of the sensor element resulting from mechanical load, for example in the event of contact with the main support, can be reliably prevented by way of the installation edge. Coatings of the sensor element which are not resistant to mechanical load, such as for example gel pads, can thus be introduced in a reliable manner.

According to a further advantageous embodiment, a lens shade is attached to the mounting arrangement. The lens shade prevents laterally incident light being reflected on glass or other enclosure parts and thus striking the sensor. An impairment of the sensor is thus prevented.

In one advantageous embodiment, the lens shade is fastened to the mounting arrangement by means of a mounting frame or by means of a soft lip. The fastening of the lens shade by means of a mounting frame exhibits increased stability. The fastening of the lens shade by means of a soft lip requires less structural space and thus leads to a further space saving.

In another advantageous embodiment, a gel pad is applied to the sensor element. The gel pad prevents mechanical damage to the sensor element resulting from mechanical load, such as for example vibration in direct contact with the windshield.

In a further advantageous embodiment, the sensor element comprises a unit for temperature measurement. The temperature measurement is performed at the windshield.

In another advantageous embodiment, the plug-in element is attached at a cranked angle with respect to the windshield. Owing to the angled positioning, the interior mirror fastening and the cable lines of the sensor element can be more easily attached and also removed.

According to one advantageous embodiment, the sensor element is a rain-light-solar-fogging sensor.

According to a further advantageous embodiment, the mounting arrangement is enclosed by a paneling that can be arranged on the interior mirror.

The invention likewise relates to the use of a mounting arrangement as described here for the fastening of a sensor element to the windshield of a motor vehicle. Through the use of the mounting arrangement as described here, the sensor element can be attached to the windshield more easily and more efficiently than was previously the case. The advantages of the use otherwise arise from the advantages of the mounting arrangement as described here.

Further features of the invention will emerge from the claims, from the FIGURE and from the description of the FIGURE. The features and feature combinations mentioned above in the description, and the features and feature combinations mentioned below in the description of the FIGURE and/or shown only in the FIGURE, may be used not only in the respectively specified combination but also in other combinations or individually.

The invention will now be discussed in more detail on the basis of a preferred exemplary embodiment and with reference to the FIGURE. 1.

BRIEF DESCRIPTION OF THE DRAWING

The FIGURE shows a mounting arrangement according to an embodiment of the invention in a schematic plan view.

DETAILED DESCRIPTION OF THE DRAWING

The FIGURE schematically shows, in plan view, the mounting arrangement 10 for the fastening of a sensor element 12 to a windshield 26 of a motor vehicle, having a main support 14 which has a receptacle 16 for the sensor element 12. The sensor element 12 has a cross section in the shape of a segment of a circle, and the receptacle 16 of the main support 14 has a clear receiving opening which is likewise circular-segment-shaped and which is adapted in terms of its dimensions to the sensor element 12.

The main support 14 is fastened to the windshield 26 by way of adhesive bonding. Owing to its circular-segment-shaped design, the structural space taken up by the sensor element 12 is reduced. This makes possible a compact interior mirror fastening, which can be positioned higher up on the windshield 26 by the distance A.

The receptacle 16 of the main support 14 is formed by an upper frame element 14a and a lower frame element 14b.

The formation of the two frame elements 14a and 14b makes it possible for the sensor element 12 to be introduced more easily, which sensor element does not need to be introduced into the circular-segment-shaped receptacle 16 before the main support 14 is attached to the windshield 26, but may also be pushed into the circular-segment-shaped receptacle 16 after the main support 14 has been fastened to the windshield 26. This structural form therefore allows simplified installation and also easy exchange of the sensor element 12.

The lower frame element 14b has an installation edge 22 for the introduction of the sensor element 12. The installation edge 22 makes it easier for the sensor element 12 to be pushed into the receptacle 16. Damage to the surface of the sensor element 12 resulting from mechanical load, for example in the event of contact with the main support 14, can be reliably prevented by way of the installation edge 22. Coatings of the sensor element 12, such as for example a gel pad, which are not resistant to mechanical load can thus be introduced more easily.

The installation edge 22 may be rounded. The installation edge 22 may also be provided with a deformable coating. Deformable coatings may be polymers, preferably rubber, foams or silicones.

A lens shade 30 is attached to the mounting arrangement 10. The lens shade prevents laterally incident light being reflected on glass or enclosure parts and thus striking the sensor element 12. An impairment of the sensor element 12 is thus prevented.

The lens shade is fastened to the mounting arrangement 10 by means of a mounting frame 24. The fastening of the lens shade by means of a mounting frame exhibits increased stability.

The lens shade may alternatively be fastened by means of a soft lip. The fastening of the lens shade by means of a soft lip requires less structural space and thus leads to a further space saving. The space saving additionally corresponds to the width B of the mounting frame 24, which is not required.

A gel pad 32 is applied to the sensor element 12. The gel pad prevents mechanical damage to the sensor element 12, in particular to the sensor receptacle, resulting from mechanical load, such as for example vibration in the case of direct contact with the windshield 26.

The sensor element 12 has a unit 18 for temperature measurement. The temperature measurement is performed at the windshield 26.

In another advantageous embodiment, the plug-in element 20 is attached at a cranked angle with respect to the windshield 26. Owing to the angled attachment, the interior mirror fastening and the cable lines for the transmission of sensor information can be more easily attached and also removed.

According to one advantageous embodiment, the sensor element 12 is a rain-light-solar-fogging sensor. The mounting arrangement 10 is enclosed by a paneling 28 that is arranged on the interior mirror.

A further embodiment is the use of the mounting arrangement 10 for the fastening of the sensor element 12 to the windshield 26 of a motor vehicle. Through the use of the mounting arrangement 10, the sensor element 12 can be attached to the windshield 26 more easily and more efficiently than was previously the case. The advantages of the use otherwise arise from the advantages of the mounting arrangement 10.

LIST OF REFERENCE DESIGNATIONS

10 Mounting arrangement
12 Sensor element
14 Main support
14a Upper frame element
14b Lower frame element
16 Receptacle
18 Unit
20 Plug-in element
22 Installation edge
24 Mounting frame
26 Windshield
28 Paneling

What is claimed is:

1. A mounting arrangement for fastening a sensor element, comprising:
    a windshield of a motor vehicle;
    a main support fastened to the windshield and having a receptacle for the sensor element, wherein
        the receptacle of the main support is formed by an upper frame element and a lower frame element,
        the sensor element has a cross-section in a shape of a segment of a circle,
        the receptacle is in the shape of a segment of a circle and adapted dimensionally to the sensor element,
        the receptacle of the main support has a clear receiving opening in the upper frame element facing inwardly from the windshield, and
        the clear receiving opening of the receptacle allows for insertion or removal of the sensor element while the main support is fastened to the windshield.

2. The mounting arrangement according to claim 1, wherein
    the lower frame element has an installation edge for the sensor element.

3. The mounting arrangement according to claim 1, wherein
    a lens shade is attached to the mounting arrangement.

4. The mounting arrangement according to claim 3, wherein
the lens shade is fastened to the mounting arrangement via a mounting frame or via a soft lip.

5. The mounting arrangement according to claim 1, wherein
a gel pad is applied to the sensor element.

6. The mounting arrangement according to claim 1, wherein
the sensor element comprises a temperature measurement unit.

7. The mounting arrangement according to claim 1, wherein
a plug-in element is attached at a non-orthogonal angle with respect to the windshield.

8. The mounting arrangement according to claim 1, wherein
the sensor element is a rain-light-solar-fogging sensor.

9. A method of fastening a sensor element to a windshield of a motor vehicle using the mounting arrangement according to claim 1.

10. A mounting arrangement for fastening a sensor element, comprising:
a windshield of a motor vehicle;
a main support fastened to the windshield and having a receptacle for the sensor element, wherein
the sensor element has a cross-section in a shape of a segment of a circle,
the receptacle of the main support is in the shape of a segment of a circle and adapted dimensionally to the sensor element,
the receptacle of the main support has a clear receiving opening, and
the receptacle is accessible from outside of the main support while the main support is fastened to the windshield.

11. The mounting arrangement according to claim 10, wherein the receptacle of the main support is formed by an upper frame element and a lower frame element.

12. The mounting arrangement according to claim 10, wherein the lower frame element has an installation edge for the sensor element.

13. The mounting arrangement according to claim 10, wherein a lens shade is attached to the mounting arrangement.

14. The mounting arrangement according to claim 13, wherein the lens shade is fastened to the mounting arrangement via a mounting frame or via a soft lip.

15. The mounting arrangement according to claim 10, wherein a gel pad is applied to the sensor element.

16. The mounting arrangement according to claim 10, wherein the sensor element comprises a temperature measurement unit.

17. The mounting arrangement according to claim 10, wherein a plug-in element is attached at a non-orthogonal angle with respect to the windshield.

18. The mounting arrangement according to claim 10, wherein the sensor element is a rain-light-solar-fogging sensor.

19. A method of fastening a sensor element to a windshield of a motor vehicle using the mounting arrangement according to claim 10.

* * * * *